United States Patent
Forsell et al.

(10) Patent No.: US 12,056,495 B2
(45) Date of Patent: Aug. 6, 2024

(54) METHOD AND ARRANGEMENT FOR HANDLING MEMORY ACCESS FOR A TCF-AWARE PROCESSOR

(71) Applicant: Teknologian tutkimuskeskus VTT Oy, Espoo (FI)

(72) Inventors: Martti Forsell, VTT (FI); Jussi Roivainen, VTT (FI)

(73) Assignee: Teknologian tutlkimuskeskus VTT Oy, Espoo (FI)

( * ) Notice: Subject to any disclaimer, the term of this patent is extended or adjusted under 35 U.S.C. 154(b) by 242 days.

(21) Appl. No.: 17/415,890

(22) PCT Filed: Dec. 20, 2019

(86) PCT No.: PCT/EP2019/086516
§ 371 (c)(1),
(2) Date: Jun. 18, 2021

(87) PCT Pub. No.: WO2020/127868
PCT Pub. Date: Jun. 25, 2020

(65) Prior Publication Data
US 2022/0075625 A1    Mar. 10, 2022

(30) Foreign Application Priority Data

Dec. 21, 2018    (EP) .................... 18215559

(51) Int. Cl.
*G06F 9/38* (2018.01)
*G06F 9/52* (2006.01)
*G06F 9/54* (2006.01)

(52) U.S. Cl.
CPC .......... *G06F 9/3851* (2013.01); *G06F 9/3824* (2013.01); *G06F 9/3867* (2013.01);
(Continued)

(58) Field of Classification Search
None
See application file for complete search history.

(56) References Cited

U.S. PATENT DOCUMENTS 7,454,666 B1 * 11/2008 Jordan ................ G06F 11/3636
714/45
11,797,310 B2    10/2023 Forsell
(Continued)

FOREIGN PATENT DOCUMENTS

EP    2806361 A1    11/2014
EP    2866138 A1    4/2015
(Continued)

OTHER PUBLICATIONS

M. Forsell, J. Roivainen and V. Leppänen, "Outline of a Thick Control Flow Architecture," 2016 International Symposium on Computer Architecture and High Performance Computing Workshops (SBAC-PADW), Los Angeles, CA, USA, 2016, pp. 1-6, (Year: 2016).*
(Continued)

*Primary Examiner* — John M Lindlof
(74) *Attorney, Agent, or Firm* — Ziegler IP Law Group LLC.

(57) ABSTRACT

An arrangement for handling shared data memory access for a TCF-aware processor. The arrangement comprises at least a flexible latency handling unit (601) comprising local memory (602) and related control logic, said local memory being provided for storing shared data memory access related data. The arrangement is configured to receive at least one TCF comprising at least one instruction, the at least one instruction being associated with at least one fiber, wherein the flexible latency handling unit is configured to determine if shared data memory access is required by the at least one instruction, if shared data memory access is required, send a shared data memory access request, via the
(Continued)

flexible latency handling unit, observe, essentially continuously, if a reply to the shared data memory access request is received, suspend continued execution of the instruction until a reply is received, and continue execution of the instruction after receiving the reply so that the delay associated with the shared data memory access is dynamically determined by the actual required shared data memory access latency.

13 Claims, 4 Drawing Sheets

(52) U.S. Cl.
CPC ............ *G06F 9/3887* (2013.01); *G06F 9/522* (2013.01); *G06F 9/544* (2013.01)

(56) References Cited

U.S. PATENT DOCUMENTS

| | | | |
|---|---|---|---|
| 2013/0185523 A1* | 7/2013 | Wang .................... | G06F 9/4552 712/225 |
| 2016/0124856 A1* | 5/2016 | Forsell ................ | G06F 12/0813 711/128 |
| 2017/0004063 A1* | 1/2017 | Broderick ........... | G06F 11/3495 |

FOREIGN PATENT DOCUMENTS

| | | |
|---|---|---|
| JP | 2016534433 A | 11/2016 |
| WO | 2015059362 A1 | 4/2015 |

OTHER PUBLICATIONS

International Search Report issued in corresponding International Patent Application No. PCT/EP2019/086516, mailed Feb. 19, 2020, 2 pages.

Japanese Notice of Reasons for Rejection received for JP Application No. 2021-536026 on Oct. 10, 2023, 6 pgs.

Forsell, Martti et al., Outline of a Thick Control Flow Architecture, 2016 International Symposium on Computer Architecture and High Performance Computing Workshops (SBAC-PADW), U.S.A, IEEE, Oct. 28, 2016, 6 pgs.

Atsushi Koike, et al., Parallel Computing Model for GPUs, The Institute of Electronics, Information and Communication Engineers Technical Report, The Institute of Electronics, Information and Communication Engineers, Oct. 24, 2012, vol. 112, No. 272, 35 pgs.

Japanese Patent Office, Notice of Reasons for Refusal, Japanese Patent Application No. 2021-536026, Date of Drafting Apr. 19, 2024, 3 pages.

* cited by examiner

METHOD AND ARRANGEMENT FOR HANDLING MEMORY ACCESS FOR A TCF-AWARE PROCESSOR

This application is a National Stage Application of PCT/EP2019/086516, filed 20 Dec. 2019, which claims benefit of Serial No. 18215559.8, filed 21 Dec. 2018 in Europe and which applications are incorporated herein by reference. To the extent appropriate, a claim of priority is made to each of the above disclosed applications.

TECHNICAL FIELD OF THE INVENTION

The invention relates to computer technology in general. Particularly, the invention relates to memory access of a processor.

BACKGROUND OF THE INVENTION

Related to software involving multithread computations, organization of the efficient cooperation between a large number of parallel threads has been a fundamental problem due to limitations of the current models. The concept of parallel thick control flows (TCF) has been introduced as a solution in V. Leppanen, M. Forsell, and J-M. Makela, "*Thick Control Flows: Introduction and Prospects*", In Proceedings of the 2011 International Conference on Parallel and Distributed Processing Techniques and Applications (PDPTA'11), Las Vegas, USA, pages 540-546, 2011. When a thick control flow (in terms of the number of fibers, which are similar to threads) is executing a statement or an expression of a program, all the fibers are considered to execute the same program element synchronously in parallel. The concept of thick control flow allows the programmer to focus on co-operation of a few parallel thick control flows instead of vast amounts of parallel threads.

The concept of TCFs may be advantageously utilized by programmers, while in addition, at least with some implementation choices for TCFs, suggest that a concept replacing the traditional thread concept could be useful for processor cores, since it supports flexibility of the theoretical model, eliminates both software and hardware redundancies and simplifies the instruction memory system.

An architecture for executing programs written for the TCF model, the thick control flow processor architecture (TPA), has been proposed previously in M. Forsell, J. Roivainen and V. Leppänen, "*Outline of a Thick Control Flow Architecture,*" 2016 International Symposium on Computer Architecture and High Performance Computing Workshops (SBAC-PADW), Los Angeles, CA, 2016, pp. 1-6.

In general, most processor architectures utilize the multiple instruction stream multiple data stream (MIMD) model, where P instructions from separate instruction flows are executed in P processing elements. This may waste resources for code containing self-similarities. A more optimal solution for this kind of code would be to use the single instruction stream multiple data stream (SIMD) in which the same instruction for P data elements is executed in P processing units. While SIMD is more cost-efficient, easier to program and implementations of it feature lower power consumption, it does not efficiently execute code with controlled parallelism and heterogeneity between the threads. Another dimension of problems is raised by the fact that in implementations of MIMD and SIMD architectures, the number of hardware threads is fixed and causes overhead when the number of software threads exceeds the supported one.

To adapt to code portions with different characteristics with respect to homogeneity, heterogeneity, number of threads and be able to execute them efficiently, TCF models, where homogeneous threads (or "fibers", as they may be called in relation to TCFs to distinguish them from more independent "threads" of regular parallel programming) going via the same control path are combined into entities called TCFs, are introduced as a possibility to take advantage of the SIMD-style optimizations and retain possibility to have multiple streams of the MIMD model where it is necessary. The TCF model does not provide a fixed number of threads, but a number of control flows that have a certain thickness that may vary according to the needs of the application.

Another set of problems affecting parallel computation is related to arrangement of intercommunication. In shared memory architectures (SMAs), data and program partitioning is typically carried out by placing data requiring processing by multiple threads into shared memory and splitting program more independently to processors, thus making programming easier compared to message passing (MPA) architectures in which processing always happens locally and the programmer is responsible for moving data around accordingly. Most SMAs use a distributed shared memory architecture consisting of multiple interconnected processor-cache pairs, which makes cache coherency (and therefore latency tolerance) and synchronicity maintenance very expensive. This may even ruin their performance in communication intensive problems.

To tackle e.g. the above problem, emulated shared memory (ESM), or shared memory emulation, architectures have been introduced. They incorporate a set of multi-threaded processors that are connected via a high-throughput intercommunication network to a common uniformly and synchronously accessible shared memory. The memory system latency is hidden by overlapping on-going memory references and a special low-cost synchronization mechanism is established guaranteeing synchronicity at machine instruction level. The ESM systems provide the user with perception of ideal shared memory even though the actual hardware architecture comprises a physically distributed memory. From a theoretical standpoint, these architectures attempt to emulate the abstract parallel random access machine (PRAM) that is commonly used as a model for describing and analyzing the intrinsic parallelism of computational problems as well as performance and cost of executing parallel algorithms due to its simplicity and expressivity. A PRAM model generally refers to a set of processors working under the same clock and a uniform single step accessible shared memory connected to them.

Accordingly, ESM is a feasible technique to address programmability and performance scalability concerns of chip multiprocessors (CMP) as it yields implied synchrony in the execution of machine instructions, efficient latency hiding, and sufficient bandwidth to route all the memory references even with heavy random and concurrent access workloads. Synchronous execution is considered to make programming easier as a programmer does not need to synchronize the threads of execution explicitly after each global memory access but can rely on the hardware to take care of that automatically, whereas e.g. in MPA, a programmer is responsible for explicitly defining communication, synchronizing subtasks, and describing data and program partitioning between threads making MPAs difficult to program. Latency hiding applied in shared memory emulation makes use of the high-throughput computing scheme, where other threads are executed while a thread refers to the global shared memory. Since the throughput computing scheme employs parallel slackness extracted from the available thread-level parallelism, it is considered to provide enhanced scalability in contrast to traditional symmetric multiprocessors and non-uniform memory access (NUMA) systems relying on snooping or directory-based cache coherence mechanisms and therefore suffering from limited bandwidth or directory access delays and heavy coherence maintenance traffic.

The TCF model may be linked to ESM and the implementing processor architecture, i.e., TCF-aware processors, e.g. TPA. The solutions needed for this are outlined at high level in the prior art, but the low-level details of the implementation are not described.

For shared memory latency compensation the prior art features a memory reply wait pipeline segment. This solution has a fixed segment length for all kinds of workloads. The length of the segment is selected in design time according to the near worst case situation. This kind of solution slows down execution especially in the cases of low memory activity, partitioned or locality-optimized patterns.

SUMMARY OF THE INVENTION

An object of the invention is to alleviate at least some of the problems relating to the known prior art. The object of the invention can be achieved by the features of the independent claims. One embodiment of the present invention provides an arrangement for handling shared data memory access for a TCF-aware processor. The arrangement comprises at least a flexible latency handling unit comprising local memory and related control logic, said local memory being provided for storing shared data memory access related data. The arrangement is configured to receive at least one TCF comprising at least one instruction, the at least one instruction being associated with at least one fiber, wherein the flexible latency handling unit is configured to determine if shared data memory access is required by the at least one instruction, if shared data memory access is required, send a shared data memory access request, via the flexible latency handling unit, observe, essentially continuously, if a reply to the shared data memory access request is received, suspend continued execution of the instruction until a reply is received, and continue execution of the instruction after receiving the reply so that the delay associated with the shared data memory access is dynamically determined by the actual required shared data memory access latency.

A method is also provided according to independent claim 14.

Having regard to the utility of various embodiments of the present invention, an arrangement and method for shared memory access (such as memory read operation) of a TCF-aware processor may provide a useful part of TCF-aware processors that may provide better performance, simpler programmability, and better cost-efficiency compared to current alternatives.

A flexible latency handling unit may be considered a functional entity comprising local memory and control logic. The local memory and control logic may be implemented as separate physical entities that may reside at separate locations or they may be implemented as a common physical entity.

The local memory of the flexible latency handling unit may comprise data memory that may be at least logically utilized by the flexible latency handling unit, wherein the local memory may store data regarding a plurality of instructions. The local memory may be a dedicated memory or it may be integrated into some other element such as hardware, e.g. a chip, that may be used to carry out control logic.

At least one instruction may be received by an arrangement according to an embodiment of the invention, wherein determining if shared data memory access is required may be carried out by recognition via one or more identifiers, operands, instruction words, and/or operation codes or some other suitable manner that may be familiar to the person skilled in the art.

The flexible latency handling unit may herein also be referred to as a flexible latency compensation unit (FLCU). The term TCF-aware processor refers to all processors that implement the TCF-model and its special cases (including but not limited to ESM, Configurable ESM (CESM) and vector/SIMD) as described in the publication M. Forsell and V. Leppänen, "*An Extended PRAM-NUMA Model of Computation for TCF Programming*", International Journal of Networking and Computing 3, 1 (2013), 98-115, and that use a similar latency compensation mechanism. Thus, in other words, the invention may provide a method for handling memory access also for example for ESM, configurable ESM, and vector/SIMD processors, which are encompassed by the term TCF-aware processor.

The FLCU may in some embodiments be implemented as comprising a first in first out (FIFO) style local memory controlled by the pipeline logic. Here, a FIFO style buffering may be utilized, possibly leading to advantages (compared to other buffering techniques) such as being straightforward to implement and/or having smaller requirements relating to silicon surface area, while still achieving high performance. With other buffering techniques, such as one where memory reference results could be read in any order, buffering may be more complex, where use of an address table, possibly e.g. with two layers, should be used in order to be able to find the correct buffered data. A more complex logic should also be implemented with other buffering types which would take into account all the unlisted rules at the moment according to which the received memory references either can or cannot be executed in different order than the corresponding memory reference requests have been sent. In another aspect, the use of FIFO buffering may be naturally favorable as it may maintain the sequence of fibers during the remaining portion of the pipeline.

In certain other embodiments and use case scenarios, however, some other buffering technique than FIFO may be used. In alternative embodiments, non-FIFO style buffers may offer some advantages, such as achieving even higher performance, for instance through even faster execution.

Many advantages may be achieved by reading from the FLCU local memory (local memory here referred to also as buffer) according to latencies of completed memory references. If an instruction does not contain a shared memory read subinstruction there is no need to wait for completed shared memory references and the execution can be continued by the next stage of the pipeline by reading the FLCU local memory essentially continuously, preferably at every clock cycle. As a result the overall performance may be improved.

In embodiments of the invention, as instructions arrive to the memory unit/FLCU, they may send their possible references to the shared data memory system. After this, instructions (data defining the instructions) and the related data, such as possible completed shared data memory references, may be written to the FLCU local memory (which may also be referred to as FLCU buffer or FLCU FIFO buffer in case of FIFO style buffering). On the other side of the FLCU local memory, the topmost instructions and data available from the FLCU local memory may be read in two cases:
1. Required reply from the shared data memory system has arrived.
2. No reply from the shared data memory system is required.

Compared to the existing fixed memory reply wait pipeline segment, the invention may allow for continuation of execution as soon as the above mentioned conditions enable this without a specific need to wait for a predefined delay.

Related to the above, an embodiment of an arrangement may comprise a flexible latency handling unit (FLCU) comprising a local memory for storing shared data memory access related data. The arrangement may additionally be configured to store data regarding at least one received instruction in the local memory. The stored data regarding the at least one instruction may comprise data defining the instruction and/or data referred to by the instruction that is to be possibly fetched through shared data memory access.

In an embodiment, the arrangement may be configured to store fibers in the local memory. As disclosed before, the data defining the instructions may be stored in the local memory ("written to the FLCU local memory") after sending possible references to the shared data memory system, while they may also be stored simultaneously to the memory references being sent or before sending the memory references. The completed memory references may be stored in the local memory at the same time as the data defining the instructions is stored or at a different time.

Through embodiments of the invention, steps (related to execution of instructions, preferably relating to a plurality of fibers) may be carried out with dynamically varying length.

Due to its ability to keep latency low for low activity and locality-optimized access patterns, the invention potentially improves the performance and simplifies partitioning of the processor to submachines.

In cases where partitioning may be affected, submachines may be smaller, adding to flexibility.

Compared to existing fixed memory reply wait pipeline segment, the invention allows for continuation of execution as soon as the conditions allow without specific need to wait for predefined delay.

Through embodiments of the memory access method and arrangement as enabled through the invention, a memory unit with flexible/varying wait or delay may be provided, wherein, however, sequences of instructions are left unchanged.

Through embodiments of the invention, a fiber executing instructions may proceed in the pipeline essentially as soon as, or at least at the next clock cycle when, a memory reference has been received. The latency or delay for waiting for the memory reference to arrive may also be substantially nonexistent in cases where no reference is required form a shared memory.

The invention may thus lead to faster execution and possibly reductions in energy usage.

An arrangement may in one embodiment consist of the flexible latency handling unit, while in other embodiments an arrangement may comprise also other entities. For example, an arrangement may comprise one or more processors, processor cores, caches, scratchpads, a pipeline construction, and/or ALUs (arithmetic logic units), which may be logically located prior to or after the flexible latency handling unit.

In one embodiment, the arrangement may be realized as a memory unit that may be comprised in the processor or may be implemented as a separate unit. For instance, in some cases the arrangement may be organized on the same integrated chip as the processor.

The exemplary embodiments presented in this text are not to be interpreted to pose limitations to the applicability of the appended claims. The verb "to comprise" is used in this text as an open limitation that does not exclude the existence of unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific example embodiments when read in connection with the accompanying drawings.

The previously presented considerations concerning the various embodiments of the arrangement may be flexibly applied to the embodiments of the method mutatis mutandis, and vice versa, as being appreciated by a skilled person.

BRIEF DESCRIPTION OF THE DRAWINGS

Next the invention will be described in greater detail with reference to exemplary embodiments in accordance with the accompanying drawings, in which.

DETAILED DESCRIPTION

Figure 1:
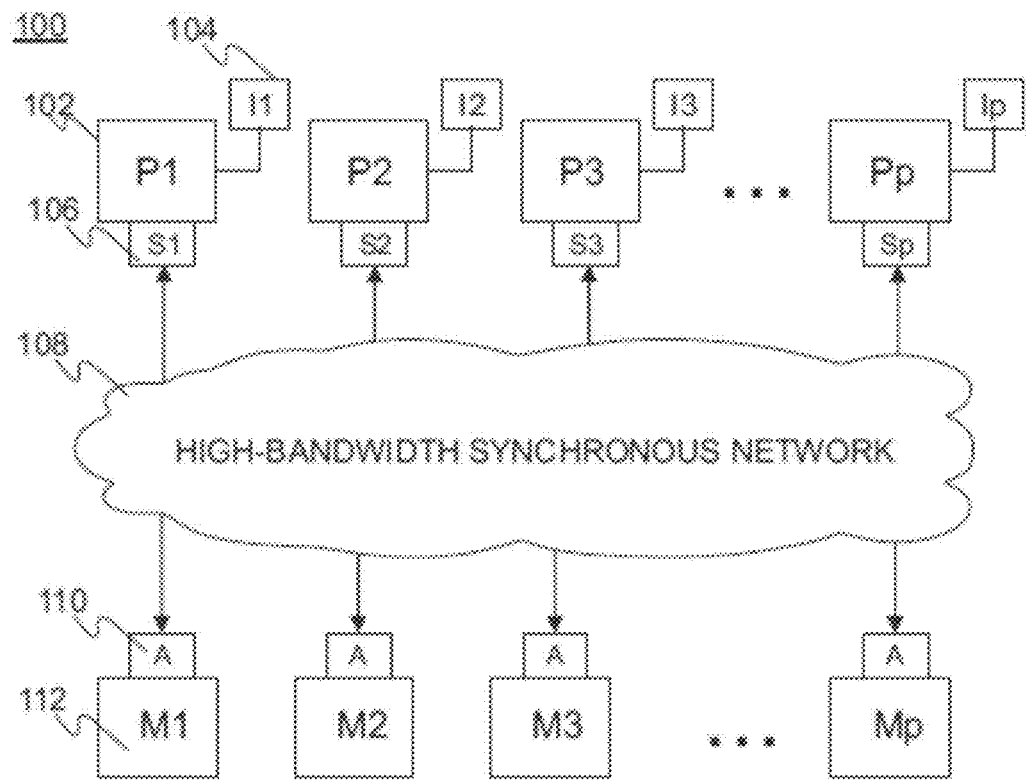
FIG. 1 illustrates a feasible scalable architecture to emulate shared memory on a silicon platform.

Firstly, the ESM architecture shall be reviewed. In FIG. 1, a high-level illustration of a scalable architecture to emulate shared memory on a silicon platform is shown. It comprises a set of processors (cores) P1, P2, P3, . . . ,Pp 102 connected to a physically distributed, but logically shared (data) memory M1, M2, M3, . . . ,Mp 112 via a physically scalable high bandwidth interconnection network 108. Active memory units 110 in connection with data memory 112 can be considered as memory control logic units utilized to process the memory references. The active memory units 110 are arranged to manage computation related to cases in which multiple memory references are targeted to the same memory location during e.g. multi(-prefix) operations, for instance. Instruction memory modules I1, I2, I3, . . . , Ip 104 are configured to carry the program code for each processor 102. To efficiently emulate shared memory by the distributed memory-based implementation, the processors 102 are multithreaded utilizing a Tp-stage cyclic, interleaved interthread pipeline (Tp≥the average latency of the network). The PRAM model is linked to the architecture such that a full cycle in the pipeline corresponds typically to a single PRAM step. During a step of multi-threaded execution (regarding the pipeline in overall, i.e. all pipeline stages including the actual execution stages), each thread of each processor of the CMP executes an instruction including at most one shared memory reference sub-instruction. Therefore a step lasts for multiple, at least Tp+1 clock cycles.

In the depicted architecture, step caches are generally associative memory buffers in which data stays valid only to the end of ongoing step of multi-threaded execution. The main contribution of step caches to concurrent accesses is that they stepwisely filter out everything but the first reference for each referenced memory location. This reduces the number of requests per location from Tp down to P allowing them to be processed sequentially on a single ported memory module assuming Tp≥P. Scratchpads are addressable memory buffers that are used to store memory access data to keep the associativity of step caches limited in implementing multioperations with the help of step caches and minimal on-core and off-core ALUs (arithmetic logic unit) that take care of actual intra-processor and inter-processor computation for multioperations. Scratchpads may be coupled with step caches to establish so-called scratchpad step cache units S1, S2, S3, . . . ,Sp 106.

One underlying idea of the reviewed solution is indeed in the allocation of each processor core 102 with a set of threads that are executed efficiently in an interleaved manner and hiding the latency of the network. As a thread makes a memory reference, the executed thread is changed and the next thread can make its memory request and so on. No memory delay will occur provided that the reply of the memory reference of the thread arrives to the processor core before the thread is put back to execution. This requires that the bandwidth of the network is high enough and hot spots can be avoided in pipelined memory access traffic. Synchronicity between consecutive instructions can be guaranteed by using an elastic synchronization wave between the steps, for instance.

Figure 2:
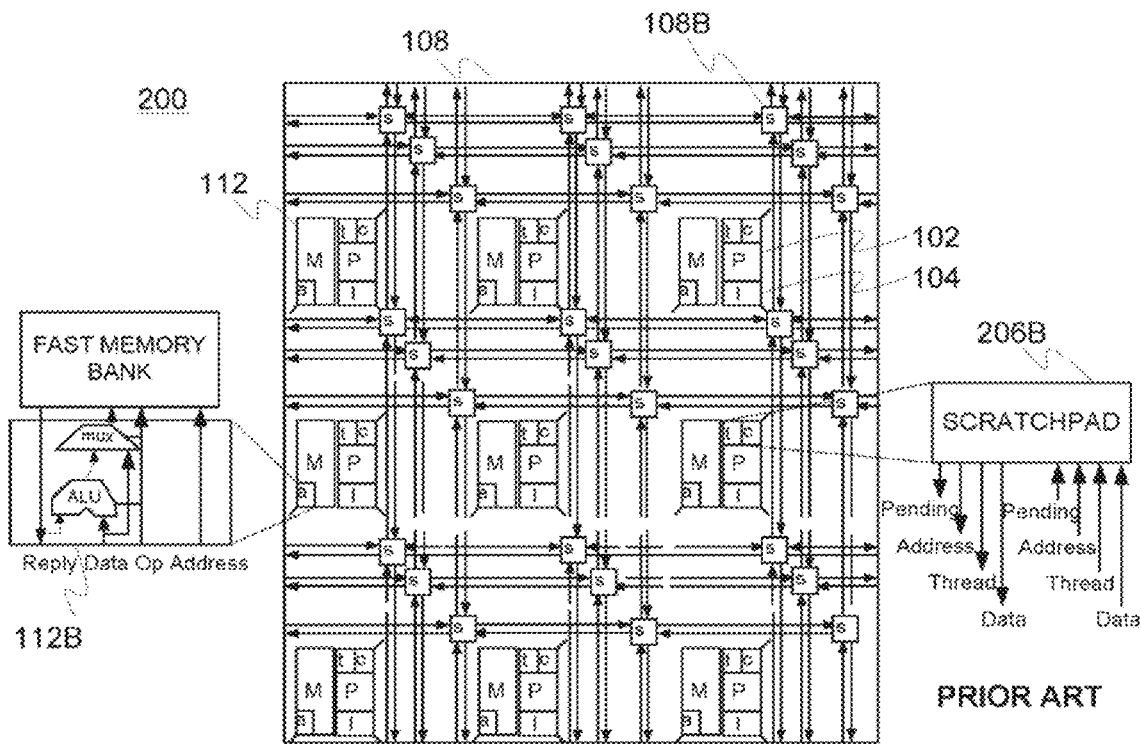
FIG. 2 is another representation of a feasible ESM architecture, essentially CMP ESM architecture.

FIG. 2 shows, at 200, one illustration of an ESM CMP architecture incorporating e.g. the aforementioned active memory units 112B (with ALU and fetcher) in connection with data memory modules 112 and scratchpads 206B. The network 108 may be a mesh-like interconnection network acting as a high-bandwidth pipelined memory system with switches 108B. The memory access latency is hidden by executing other threads while a thread is referencing the uniformly accessible distributed shared memory via the network 108. Congestion of references and hot spots in communication can be avoided with an efficient dead-lock free intercommunication architecture featuring high bandwidth (bisection BW≥P/4) and randomized hashing of memory locations over the distributed memory modules. Execution of instructions happens in steps corresponding to a single PRAM step during which each thread executes a single instruction.

Next, moving to the concept of TCFs, the TCF model may pack together computational elements containing similarities for exposing natural synchronicity of parallel execution and provide a simple explicit mechanism for dynamically adjusting the number of elements executed in parallel.

The TCF model is a programming model combining homogeneous computations having the same control flow into data parallel entities controlled by a single control rather than keeping individual control for each computation. The resulting entity is called TCF and components of it are called fibers. The number of fibers in a TCF is called thickness of it.

When a thick control flow (in terms of the number of fibers) is executing a statement or an expression of a program, all the fibers are considered to execute the same program element in parallel. More precisely, we consider that some of the program variables can be replicated fiber-wise—conceptually meaning that there is a unique fiber-wise instance of the variable. An expression based on using a replicated variable is conceptually also replicated—meaning that it needs to be evaluated separately for each fiber. Similarly, statements can also be replicated. However, all expressions or statements executed by a thick control flow do not need to be replicated—such non-replicated (ordinary) program elements naturally only need to be evaluated/executed once by the thick flow, not fiber-wise. Thus, when a thick flow proceeds over a program fragment, some of the expressions/statements translate to single instructions whereas replicated ones translate to sets of instructions.

Considering method calls, when a control flow with thickness t calls a method, the method is not called separately with each fiber, but the control flow calls it only once with t fibers. A call stack is not related to each fiber but to each of the parallel control flows. Thus here, the concept of a fiber as being a thread is only implicit. A thick fiber-wise variable is an array-like construct having a fiber-wise actual value. Executing a branching statement can mean temporarily splitting a thick control flow into several other flows.

Execution of a TCF happens one instruction at a time. The time during which all fibers of a TCF execute an instruction, is called a step. TCF execution resembles SIMD execution but there can be multiple TCFs executing simultaneously and their thicknesses can vary arbitrarily. The TCF model guarantees synchronicity and strict memory consistency between consecutive instructions so that all shared memory actions launched by the previously replicated instruction are guaranteed to complete before the operations of the current one take place. This may reduce the cost of synchronization w.r.t. ESM since synchronizations happen once per step defined by software not hardware. If there are multiple TCFs, the mutual execution ordering of them is not strictly defined but the programmer can instruct them to follow certain ordering via explicit inter-TCF synchronizations.

Since the thickness of a TCF can be defined by the programmer without bounds, it is easy to express intrinsic parallelism of a wide spectrum of computational problems without a worry about running out of threads or having to match the software parallelism with the hardware parallelism with loops or explicit threads. Besides reducing the number of loops, the model may simplify programming also by eliminating index calculations related to threads.

Originally, a program is considered to have a flow of thickness one, measured conceptually in number of parallel implicit threads. A method can be considered to have a thickness related to the calling flow's thickness. For dynamically changing the thickness of the flow, we have a thick block statement, which sets a new thickness for a block or a thickness statement that sets the thickness for the statements to be executed. For the former, nesting thick and ordinary block statements is supported. Consider a situation where a thick block $B_{outer}$ of thickness $T_{outer}$ contains an inner thick block $B_{inner}$ of thickness $T_{inner}$. A nested block is not executed fiber-wise but flow-wise, and therefore considering the flow thickness, a flow executing the inner thick block has thickness $T_{inner}$ (instead of $T_{outer} \times T_{inner}$). In the case of statement setting the thickness for the statements to be executed, the thickness for each code segment is specified explicitly.

Figure 3:
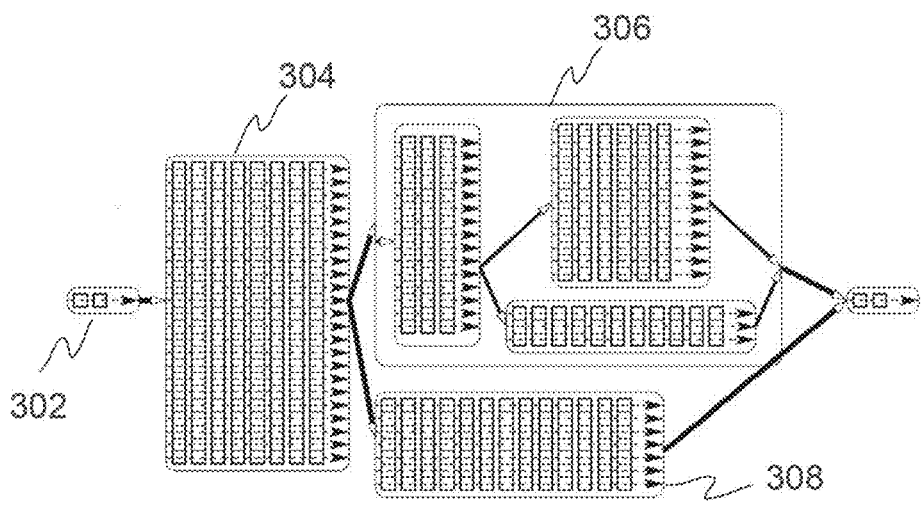
FIG. 3 illustrates an example of executing functionality with TCFs.

Executing a control statement (if, switch, . . . ) can temporarily mean splitting a thick control flow into several other flows as illustrated in FIG. 3. A first block 302 of thickness one, comprising two consecutive instructions may continue into a second block 304 of thickness 23 and 8 consecutive instructions. The second block 304 may then be split into two parallel third and fourth blocks 306 and 308, the third block 306 having an inner block of thickness 15 having a branching statement after 3 instructions, thereafter splitting into two other inner blocks, resulting in parallel branches having thicknesses 12 and 3. The parallel blocks may be once again joined after splitting.

The potentially non-continuous fiber subgrouping (non-continuous indexing of implicit threads) that results from splitting of a thick control flow may be considered rather costly to implement. Thus, each parallel branch may be considered as a nested thick block with thickness determined by the number of implicit threads "selecting" the branch. The implicit thread of the surrounding block will not continue in the blocks determined by the branching statement. As the above is equal to parallel execution of multiple paths with given thicknesses, it may be required that the whole flow selects exactly one path through a control statement. If a programmer wants to execute multiple paths in parallel, he should give a parallel statement creating multiple control flows accordingly and set the thicknesses for them. Besides splitting the current flow into a number of parallel flows, a parallel statement may also perform an implicit join of the flows back to the calling flow at the end of the statement. All fibers of a control flow can be seen to synchronously march through the common program code like in a dynamic SIMD model. When a flow is split into separate flows, nothing can be assumed about the advancing speed of the split flows—i.e., in this sense the parallel flows are asynchronous with respect to each other. However, if the programming language designer wants to, he can make execution synchronous at machine instruction level.

The TCF model can basically be programmed like other parallel programming models but the nature of the model opens up possibilities for novel conventions that have substantial implications to notation, behavior and/or interpretation of computation. These may include synchronous parallel programming, reduction of loops to parallel statements, easy control of parallelism during execution, and shorter program code.

The ESM, CESM, and vector/SIMD systems which have been reviewed more extensively in prior art publications can then be considered as simple versions of TCF systems. In the case of ESM and configurable ESM, the thickness of TCFs would be one and they can also be called threads, while for the vector/SIMD case, the TCFs can be called vectors and fibers as vector elements.

The functionality with TCFs may execute faster in a truly TCF-aware architecture than the same functionality in the SIMD architecture assuming the former supports overlapping computing of TCFs.

Figure 4:
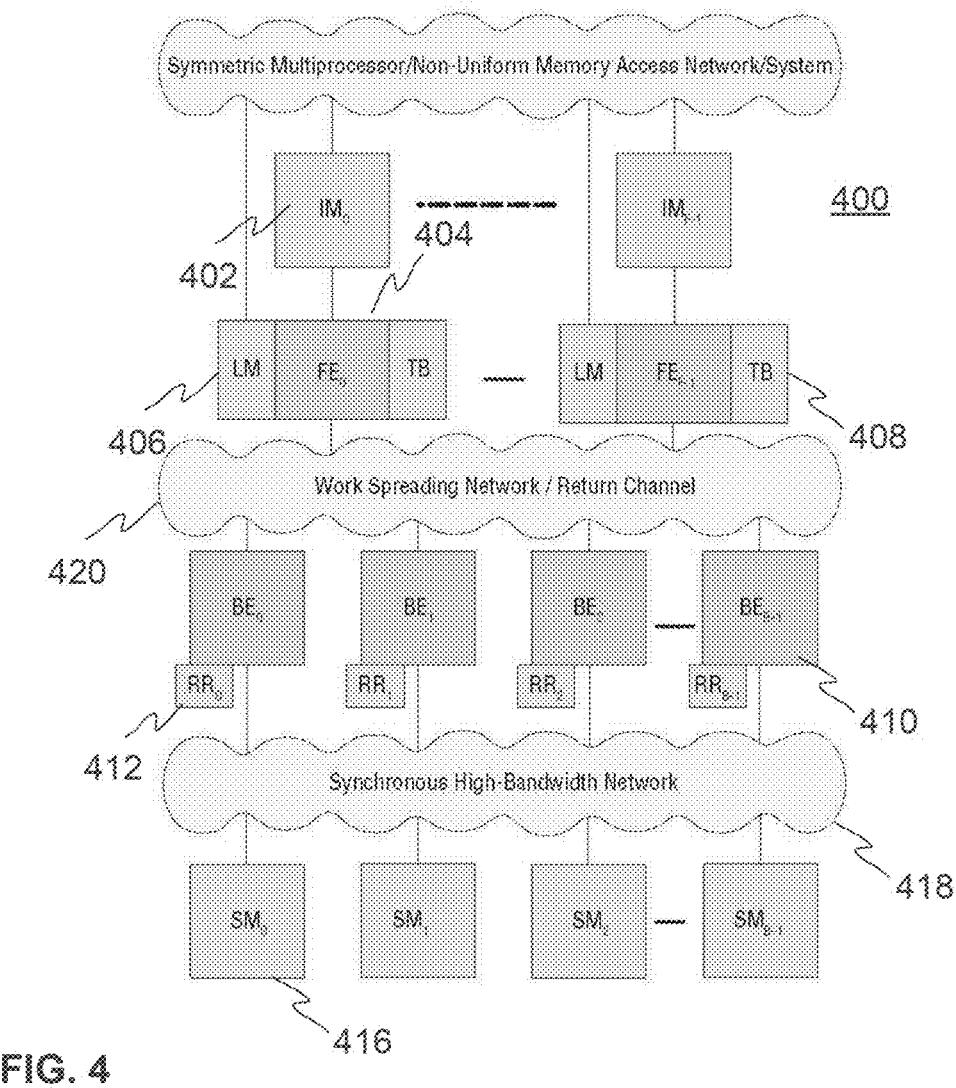
FIG. 4 shows the overall structure of a TPA.

FIG. 4 shows at 400 an overall exemplary structure of a thick control flow processor architecture (TPA), which is an architecture natively implementing the TCF programming model. Shown in the figure are instruction memory (IM) 402, processor frontend (FE) 404, local memory (LM) 406, TCF buffer (TB) 408, processor backend unit (BE) 410, replicated register block (RR) 412, and shared memory module (SM) 416. A TPA chip multiprocessor may comprise F (super)scalar processor frontends 404 attached to instruction memory modules 402, local memories 406 and TCF buffers 408 organized as conventional memory system for multicore processors, as well as B parallel processor backends 410, attached to replicated register blocks 412, and shared memory modules 416 via the communication network 418.

The processor frontends 404 may support fast switching between a number of TCFs, management of them, execution of control and other common parts of the code. Architecturally they may resemble multithreaded superscalar processors but instead of threads, TCFs with their own register sets are kept in the TCF buffers. Mimicking the terminology used with multithreaded processors, this could be called multi-TCFing. The memory systems of frontends 404 may comprise instruction memories 402 and local data memories 406 optionally interconnected via a network making use of the of the symmetric multiprocessor (SMP) or non-uniform memory access (NUMA) convention with optional cache coherence maintenance. This suggests that current multicore processors could be used as frontends 404 with relatively small modifications.

The processor backends 410 may support a streamlined shared memory system with fiber-wise data and execute homogeneous parallel parts of the code. The structure of them may resemble that of emulated shared memory (ESM) pipelines with capability of dynamic fiber execution. Like ESM processors, they may use scalable latency hiding via multifibering, radical synchronization cost reduction via wave synchronization, and improved low-level parallelism exploitation via chaining of fundamental units (FUs), such as arithmetic logic units (ALUs), to provide high performance in parallel execution.

Sending information from the frontends 404 to backends 410 and vice versa may be taken care of by the work spreading network and return channel 420. The work spreading network 420 may attach a frontend 404 of a TCF-aware processor to the backends 410. The main purpose of it is to pass operation codes for the backends' functional units along with selected data/operands. The return channel 420 may take care of sending selected backend data to the frontend 404 that is controlling the backend unit 410. Since there are typically multiple backend units 410 controlled by a single frontend 406, the return channel may 420 pass multiple data values or alternatively does a reduction to obtain a single value.

The idea in multifibering is to execute other fibers while a reference of a fiber proceeds in the memory system. If the number of fibers is high enough and the intercommunication network is not congested, the reply may arrive before it is needed by the fiber. The first synchronization method exploits the fact that fibers are independent within a step of execution and may perform the synchronization action only once per step. The second one may allow to overlap synchronizations with memory references. These together define the low-cost synchronization wave mechanism in which the amortized overhead caused by synchronization drops down to 1/thickness. The idea in low-level parallelism exploitation is to connect FUs as a chain so that a unit can use the results of its predecessors as operands rather than connect units in parallel requiring operations to be independent. This may increase the utilization of FUs by allowing the pipeline to execute dependent subinstructions.

The interplay between frontends 404 and backends 410 may happen by assigning a TCF to a single frontend 404 and multiple frontends 404 in an overlapped way. This kind of a single mode dual-purpose operation can avoid the dual mode operation and switching overheads between them present in ESM architectures. Support for unbounded thickness may be implemented by generating fibers (or replicating instructions) dynamically on the pipeline and saving the fiber-wise data into special replicated register blocks that overflow their content to external memory system if necessary.

Execution of instructions in the TPA architecture differs somewhat from that of the NUMA or ESM architectures. While an Fn-FU NUMA core executes at most Fn independent (sub)instructions in parallel and an Fe-FU ESM executes an instruction with up to Fe subinstructions for a fixed number of threads per step in interleaved manner, the TPA may execute sequences of frontend instructions and parallel backend instructions for a variable number of TCFs with non-constant thickness in an interleaved manner. More specifically, execution of a single TCF assigned to a frontend and a number of backends units in TPA may be carried out as follows:

- The frontend 404 responsible of managing TCFs may switch the next TCF from its TCF buffer and make it current if requested by the previous instruction. Otherwise the current TCF continues to be used. The frontend 404 may then execute a sequence of scalar instructions defined by the program counter and instruction memory. As it meets an instruction containing a backend operation, it may try to send the operation along with its operands to the related backend units 410 via the work spreading network 420. If the network is busy then the frontend 404 may wait until there is room for the TCF and then continue until there is an explicit TCF switch request.
- Execution in each related backend unit 410 may start by checking whether the unit is free. In the positive case, the parallel operations, their operands and necessary TCF info on the head element of the work spreading network 420 may get fetched into execution to all related backend units 410. In the negative case, the instruction in the work spreading network 420 waits for parallel units to become free.
- The TCF may then be split between the related backend units 410 as evenly as possible and the backends start to generate and process fibers in parallel until they run out.
- During the fiber generation each fiber may get its operands, fiber identifier and instructions for FUs from the data sent by the frontend while the fiber-wise intermediate results are fetched from the replicated register block 412.
- Fibers may then propagate through the pipeline and execute the subinstructions in the backend functional units.

More specifically, it may be specified that TPA instructions may be executed in three front-end phases and three backend phases:

For each active frontend 404 phases may comprise:

F1. Select the next TCF from the TCF buffer 408 if requested by the previous instruction.

F2. Fetch (sub)instruction(s) pointed by the PC of the current TCF from the NUMA memory system.

F3. Execute the subinstructions in the functional units specified by the (sub)instruction(s). Memory subinstructions are typically targeted to the SMP/NUMA memory system. If the instruction contains a backend part, select operands and send them along with the part to the backends 410 assigned to the frontend 404 via the work spreading network 420. Store the data of the current TCF to the TCF buffer 408 and switch to the next TCF if requested by the corresponding subinstruction.

For each backend 410 phases may comprise:

B1. If the backend 410 is not executing the previous instruction anymore, fetch the next instruction from the work spreading network 420 and determine the fibers to be executed in the backend. Otherwise continue executing the previous instruction.

B2. Generate the fibers of the TCF to be pipelined according to the assignment determined in B1.

B3. For each fiber the following may be conducted:

B3.1 Select the operands from the received frontend data and replicated register block 412.

B3.2 Execute the backend subinstructions. Memory subinstructions are targeted to the shared memory system.

B3.3 Write back the replicated register block and send the optional reply data back to the frontend 404 via the return channel built into the work spreading network 420.

After all active TCFs of a frontend 404 have been in execution for a single instruction, TPA may issue a special synchronization TCF of thickness one per backend that sends and receives a synchronization to/from the shared memory system.

Figure 5:
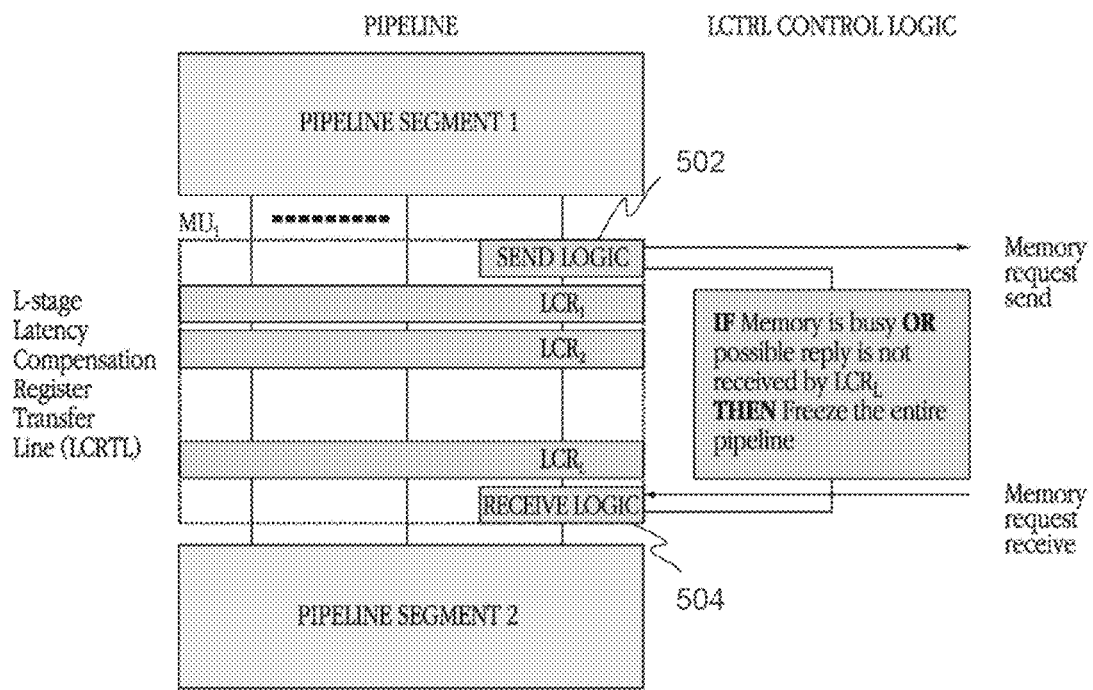
FIG. 5 shows a method for retrieving data from memory.

FIG. 5 shows a method for retrieving data from shared memory that may be implemented in the TCF architecture at a backend unit, this method essentially corresponding to those which have already been implemented in prior art solutions. For instance, ESM memory units have been previously presented, where a reply wait queue is employed. The vertical lines may represent separate fibers that may be executed in the processor pipeline, with pipeline segment 1 representing the portion of the pipeline prior to the memory access handling and pipeline segment 2 representing the portion of the pipeline at least logically situating after the memory access handling, wherein the memory access handling refers to a memory access stage where a shared memory unit is accessed. The send logic 502 may, if a reply is required from the shared memory unit, send a request to the shared memory unit. The memory access operations may enter a latency compensation register transfer line (LCRTL), with L wait stages $LCR_1 \ldots LCR_L$, in its operation essentially corresponding to the reply wait queue of known ESM systems.

The LCRTL has an L-stage latency compensation such that L may be the fixed segment length. Corresponding to e.g. the reply wait queue of ESM memory units, the segment length L for all kinds of workloads is fixed. The length of the segment may be selected according to near worst case scenario during time of design of the MU. If, for instance, it is concluded that receiving a reply may at most take a certain number of clock cycles, it may be selected to use a number of clock cycles that is slightly smaller than this as a fixed reply wait time/segment length. Thus, all types of memory references wait for the same predetermined time, perhaps unnecessarily, as some memory references will be completed before this time. If the shared memory is busy then the entire backend pipeline is freezed until the memory access command pipeline may be resumed. The memory references proceed in the pipeline and a minimum of L stages is the delay that is required for all workloads. The receive logic 504 observes if the possible reply is received by $LCR_L$ and freezes the pipeline if not.

Figure 6:
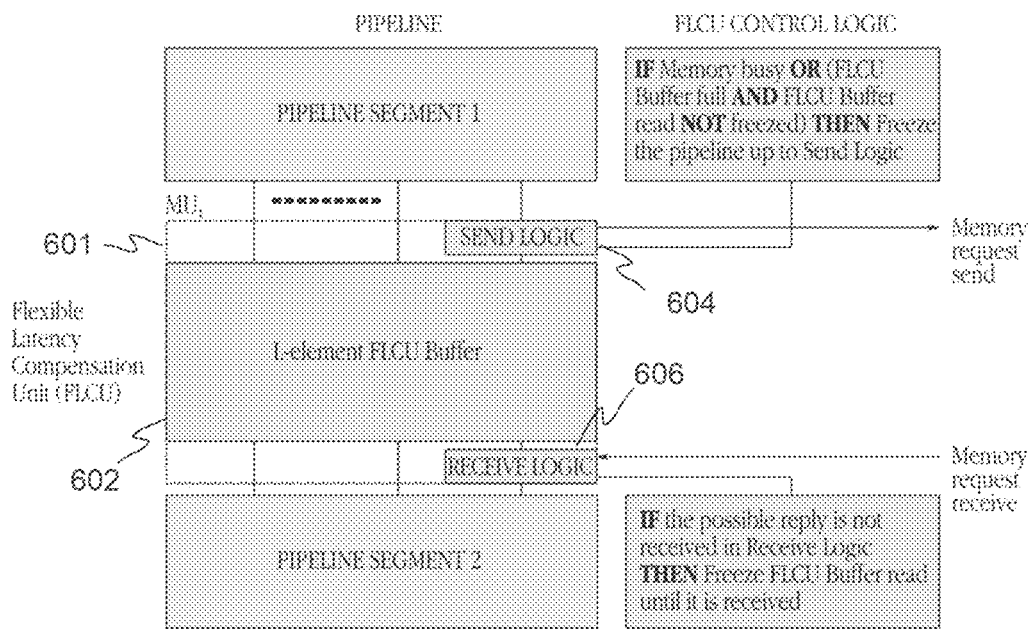
FIG. 6 shows a preferred method for retrieving data from memory according to one embodiment of the present invention, and FIG. 7 gives one other exemplary view of a method for retrieving data from memory according to one embodiment of the present invention.

FIG. 6 gives a preferred method for retrieving data from shared memory that may be implemented in the TCF architecture according to one embodiment of the invention, where a flexible latency compensation unit (FLCU) 601 may be employed. The FLCU 601 may comprise local memory 602, here referred to as L-element FLCU buffer 602, and control logic. L here refers to depth of the local memory buffer 602, i.e., how may memory reference requests it may hold. L may be selected arbitrarily, but in practice it may be beneficial to determine L so that it is larger than the maximum latency for of a memory read request, preferably for a situation where no traffic is present for communication.

The control logic may comprise send logic 604 functionally located prior to the local memory 602 and receive logic 606 functionally located after the local memory 602.

If at least one fiber is being executed (thickness of TCF$\geq$1), the TCF model advantageously allows synchronous operation of steps so that the shared memory references generated by the previous step are completed before the current step starts. In an embodiment, the FLCU 601 may enable the results of shared memory references to be available for all the fibers in a TCF during the current step.

The length of a step and/or execution of an instruction may be dynamically varied according to the actual required latencies of shared memory references.

At least fiberwise, the shared memory access may in one embodiment be implemented using first in first out principles. That is to say, completed shared memory references may be utilized in the order that they are called for by a sequence of instructions in a fiber.

The send logic 604 may observe if the shared memory is busy and if so, freeze the pipeline up to the send logic 604. If the FCLU buffer 602 is being read while it is full (already holding L requests), then at the same clock cycle, new data may be written to the space that is freed through the read operation. The pipeline may then also be freezed up to the send logic if the send logic observes that the FCLU buffer 602 is full, and if the FLCU read unit is not freezed. It is to be noted that also buffers where it is not possible to write and read data during a single clock cycle can be used as multi-buffer constellations, where one of the buffers is written and another is read.

Especially when FIFO style buffering is used, memory references may be accessed at the FLCU memory unit 602 and the receive logic 606 may observe, advantageously at every clock cycle, if a memory reference is completed. If the possible reply is not received, the FLCU buffer read may be freezed/suspended until the reply is received. This suspend time may be called also the latency or delay and may thus be flexible, i.e., variable depending on how long it takes for the required memory reference to be received. The latency may also be essentially zero if no memory reference is required.

Through embodiments of the invention, the delay associated with shared data memory access may then be dynamically determined by the actual required shared data memory access latency, which may give advantages over e.g. memory reply wait pipeline segment or predetermined latency register transfer line, for instance the LCRTL of FIG. 5.

Figure 7:
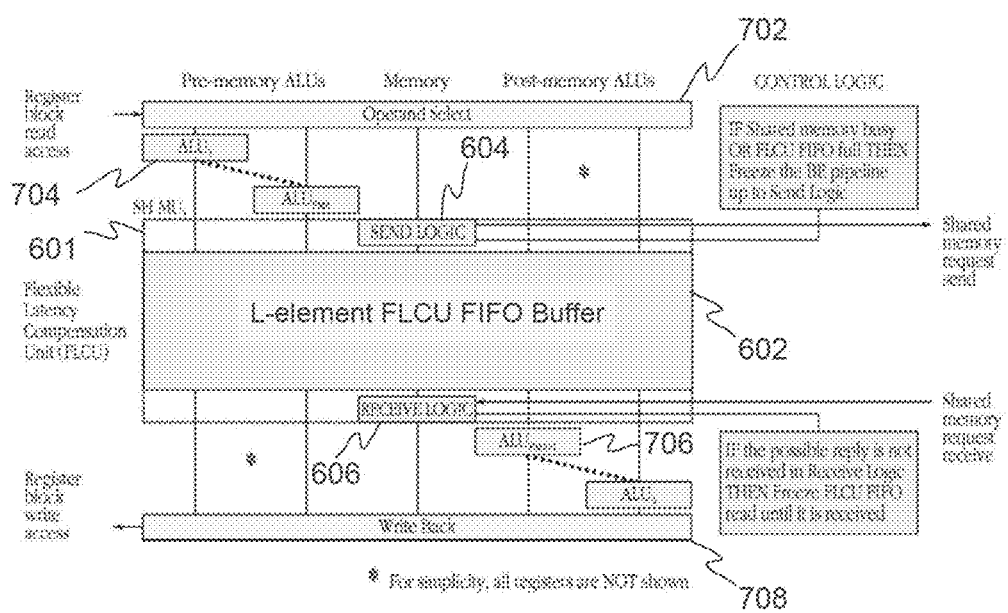

FIG. 7 gives one other exemplary view of a method for retrieving data from memory according to the invention, with FIFO buffering (and FLCU 601 comprising local memory referred to here as FLCU FIFO buffer 602, accordingly) and exemplary components of pipeline segments. When a TCF comes into execution, the operand select logic 702 may retrieve required operands related to each fiber from the replicated register block 412. One or more pre-memory ALUs 704 may be logically positioned prior to the memory access stage, whereas ALUs 706 located after the memory access may additionally also be applied. A write back logic 708 may then write to the replicated register block 412.

In the embodiment of FIG. 7, the send logic 604 may observe if the shared memory is busy or the FLCU FIFO buffer 602 is full and freeze the pipeline in either case up to the send logic 604.

Memory references may then be accessed at the FLCU FIFO buffer 602 and the receive logic 606 may observe, advantageously at every clock cycle, if a memory reference is completed. If the possible reply is not received, the FLCU FIFO buffer read may be freezed/suspended until the reply is received.

In embodiments of the invention, TCFs, even at their simpler implementations in connection with e.g. ESM, CESM, or vector/SIMD enable the provision of a memory unit with flexible i.e. dynamic delay, at least in cases where the receiving unit of the memory handles at least some functionality independently and not relying for instance on a fixed, predetermined latency register transfer line/memory reply wait pipeline segment.

In some embodiments, the invention may be utilized with non-TCF processors, where memory references are waited for, where without the invention, a register transfer line with fixed delay would be utilized.

The invention has been explained above with reference to the aforementioned embodiments, and several advantages of the invention have been demonstrated. It is clear that the invention is not only restricted to these embodiments, but comprises all possible embodiments within the spirit and scope of inventive thought and the following patent claims.

The features recited in dependent claims are mutually freely combinable unless otherwise explicitly stated.

The invention claimed is:

1. An arrangement for handling shared data memory access for a thick control flow processor architecture, the arrangement comprising at least a flexible latency handling unit comprising local memory and related control logic, said local memory being provided for storing shared data memory access related data, wherein the arrangement is configured to receive at least one thick control flow (TCF) comprising a plurality of fibers, each fiber comprising a plurality of instructions, wherein each TCF is executed in one instruction at a time, and a step is completed when all of the fibers of the at least one TCF have executed an instruction, wherein the flexible latency handling unit is configured to:
   determine if shared data memory access is required by the at least one instruction,
   if shared data memory access is required, send a shared data memory access request,
   via the flexible latency handling unit, observe, once per clock cycle, if a reply to the shared data memory access request is received,
   suspend continued execution of the instruction until all shared data memory references related to the instruction have been received, and
   continue execution of the instruction after receiving the shared data memory references so that the delay associated with the shared data memory access, relative to clock cycles, is dynamically determined by the actual required shared data memory access latency and corresponds to a minimum of one clock cycle, so that the shared memory references generated by a previous step are completed before starting a next step, and the length of a step is determined by the actual required latencies of shared data memory references.

2. The arrangement of claim 1, wherein the shared data memory access is implemented using first in first out principle, optionally between and/or within fibers.

3. The arrangement of claim 2, configured to store data regarding a plurality of instructions in the local memory and continue execution of each instruction after receiving the reply, if any, which is executed in accordance with the first in - first out principle having regard to the order of receipt of the instructions.

4. The arrangement of claim 1, wherein the arrangement is additionally configured to store data regarding the at least one instruction in the local memory, the data regarding the at least one instruction comprising data defining the instruction and/or data referred to by the instruction to be fetched through shared data memory access.

5. The arrangement of claim 1, wherein execution of a sequence of instructions is suspended for all fibers that are executing a similar sequence until all shared data memory references related to all fibers for a respective instruction have been received.

6. The arrangement of claim 1, wherein the control logic comprises a send logic functionally located prior to the local memory, wherein the send logic is configured to suspend at least a portion of the processor pipeline if the shared data memory is busy and/or if the local memory is full.

7. The arrangement of claim 6, wherein the processor pipeline is suspended up to the send logic.

8. The arrangement of claim 1, wherein the control logic comprises a receive logic functionally located after the local memory, wherein the receive logic is configured to suspend at least a portion of the processor pipeline until the reply is received.

9. The arrangement of claim 8, wherein a read unit associated with the flexible latency handling unit and/or the processor pipeline following the receive logic is suspended.

10. The arrangement of claim 1, wherein the arrangement is configured to receive data from one or more arithmetic logic units (ALUs) logically located prior to the flexible latency handling unit.

11. The arrangement of claim 1, wherein the arrangement is configured to send data to one or more arithmetic logic units (ALUs) logically located after the flexible latency handling unit.

12. The arrangement of claim 10, wherein two or more ALUs are chained to pass data between them, preferably as processed in two or more ALUs.

13. A method for handling shared data memory access in a thick control flow processor architecture, the method comprising
  receiving at least one TCF comprising a plurality of fibers, each fiber comprising a plurality of instructions, wherein each TCF is executed one instruction at a time, and a step is completed when all of the fibers of the at least one TCF have executed an instruction,
  determining if shared data memory access is required by the at least one instruction,
  if shared data memory access is required, sending a shared data memory access request,
  via a flexible latency handling unit, observing, once per clock cycle, if a reply to the shared data memory access request is received,
  suspending continued execution of the instruction until shared data memory references have been received, and
  continuing execution of the instruction after receiving the shared data memory references so that the delay associated with the shared data memory access, relatives to clock cycles, is dynamically determined by the actual required shared data memory access latency and corresponds to a minimum of one clock cycle, so that the shared memory references generated by a previous step are completed before starting a next step, and the length of a step is determined by the actual required latencies of shared data memory references.

* * * * *